(12) United States Patent
Oakes, III et al.

(10) Patent No.: US 9,020,837 B1
(45) Date of Patent: Apr. 28, 2015

(54) SYSTEMS AND METHODS FOR MOBILE AUTOMOBILE INFORMATION

(75) Inventors: Charles Lee Oakes, III, Boerne, TX (US); Rickey Dale Burks, Boerne, TX (US); Michael Patrick Bueche, Jr., San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 965 days.

(21) Appl. No.: 12/062,694

(22) Filed: Apr. 4, 2008

(51) Int. Cl.
*G06Q 30/00* (2012.01)
*G06Q 30/02* (2012.01)

(52) U.S. Cl.
CPC .................. *G06Q 30/0271* (2013.01)

(58) Field of Classification Search
USPC .................. 705/26, 27, 26.1, 27.1
See application file for complete search history.

(56) References Cited

U.S. PATENT DOCUMENTS

| | | | |
|---|---|---|---|
| 5,931,878 A | 8/1999 | Chapin, Jr. | |
| 6,041,310 A * | 3/2000 | Green et al. | 705/27 |
| 6,263,320 B1 | 7/2001 | Danilunas et al. | 705/35 |
| 6,434,530 B1 * | 8/2002 | Sloane et al. | 705/1 |
| 6,535,802 B1 | 3/2003 | Kramer | |
| 6,772,145 B2 | 8/2004 | Shishido | |
| 6,895,388 B1 | 5/2005 | Smith | 705/26 |
| 7,028,002 B2 | 4/2006 | Wakabayashi et al. | 705/26 |
| 7,184,974 B2 | 2/2007 | Shishido | |
| 7,302,429 B1 * | 11/2007 | Wanker | 1/1 |
| 2002/0023230 A1 | 2/2002 | Bolnick et al. | 726/28 |
| 2002/0188484 A1 * | 12/2002 | Grover et al. | 705/4 |
| 2005/0086070 A1 * | 4/2005 | Engelman | 705/1 |
| 2006/0155614 A1 * | 7/2006 | Woytowick et al. | 705/27 |
| 2006/0187043 A1 * | 8/2006 | Allen | 340/572.1 |
| 2006/0229981 A1 * | 10/2006 | Crites | 705/40 |
| 2007/0136163 A1 * | 6/2007 | Bell | 705/35 |
| 2007/0150403 A1 | 6/2007 | Mock et al. | |
| 2007/0239474 A1 | 10/2007 | Christie | |
| 2008/0081608 A1 | 4/2008 | Findikli et al. | |
| 2008/0140432 A1 * | 6/2008 | Fenn | 705/1 |

OTHER PUBLICATIONS

"Secure e-commerce using mobile agents on untrusted hosts" [Retrieved on Feb. 18, 2008], Retrieved from the internet <URL: http://scholar.google.com/>.
"Car Data Check", [retrieved on Feb. 16, 2008]. Retrieved from the Internet: <URL: http://www.ukvehiclecheck.com>, 4 pgs.
"U.S. Appl. No. 12/062,711, Non Final Office Action mailed Jun. 25, 2009", 13 pgs.
"U.S. Appl. No. 12/062,729, Non Final Office Action mailed Jun. 22, 2009", 14 pgs.

* cited by examiner

*Primary Examiner* — Brandy A Zukanovich
(74) *Attorney, Agent, or Firm* — Baker & Hostetler LLP

(57) ABSTRACT

A mobile automobile information system and methods are described. Data such as images may be captured from a vehicle dealer sticker with a mobile device and analyzed. The sticker may contain machine-readable information such as a barcode. The collected data may be analyzed to determine vehicle and vehicle related information. Dealer information and vehicle purchase related information may also be generated. The results of the analysis may be provided to the user's mobile device. Purchase assistance may be provided to the user through the mobile device, answering user inquiries and providing vehicle purchase information to the user during the purchase process.

24 Claims, 4 Drawing Sheets

SYSTEMS AND METHODS FOR MOBILE AUTOMOBILE INFORMATION

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 12/062,711, and U.S. patent application Ser. No. 12/062,729, each filed on Apr. 4, 2008 and each entitled "SYSTEMS AND METHODS FOR MOBILE AUTOMOBILE INFORMATION."

BACKGROUND

Purchasing a vehicle can be a daunting task. More varieties of vehicles are available with each passing year, and there are an increasing number of places and ways to buy them. While many vehicles are becoming more sophisticated and offering more options, they are also becoming more complicated. It is increasingly difficult for the average consumer to acquire all the knowledge about the available vehicles necessary to be sure that they are making the correct vehicle purchase decision. The average consumer may also have difficulty determining the best source from which to obtain a new or used vehicle. For most consumers, purchasing a vehicle is an occasional event, with often many years passing between purchases. This may prevent the average consumer from establishing a trusting relationship with a specific dealer or salesperson. Thus, there is a greater need today to assist the average consumer with determining whether a particular vehicle and/or seller is the right option to service the consumer's vehicle purchase needs.

SUMMARY

Systems and methods are provided for a mobile automobile information system. In one non-limiting example, information may be obtained about a vehicle by analyzing data collected from the vehicle using a mobile device. An image of a portion or the entirety of a vehicle dealer sticker may be received from a user, analyzed, and information based on the analysis may be provided to the user. In one embodiment, a machine-readable representation of information may be on the dealer sticker and evaluated from the image. In another embodiment, line items or dealer information is captured in the image and evaluated. Information relevant to the vehicle is generated and sent to the user. The information may be transmitted to the user's mobile device.

In another non-limiting example, a user may obtain purchase assistance from a mobile automobile information system. A user may send a request for purchase assistance from the user's mobile device while the user is at a vehicle dealer. The mobile automobile information system may transmit inquiries to the mobile device, to which the user may respond. The mobile automobile information system may provide information about the vehicle being purchased or the purchase transaction. The mobile automobile information may also send purchase related information to the user, such as insurance quotes or financing offers. Purchase assistance may be completely automated or the user may request human intervention.

BRIEF DESCRIPTION OF THE DRAWINGS

The foregoing summary and the following detailed description of preferred embodiments are better understood when read in conjunction with the appended drawings. For the purposes of illustration, there is shown in the drawings exemplary embodiments; however, the subject matter is not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, it is contemplated that the claimed subject matter might also be embodied in other ways, to include different steps or elements similar to the ones described in this document, in conjunction with other present or future technologies.

When evaluating a vehicle for a possible purchase, many buyers will want to know as much about the vehicle as possible. While this can be accomplished through time-intensive research, it is difficult to do so while at a dealer looking at vehicles. Many purchasers narrow down their selection of potential vehicles by first visiting dealer lots. In one embodiment, the present subject matter provides a means for a purchaser to obtain information about a vehicle while on the dealer lot.

Figure 1:
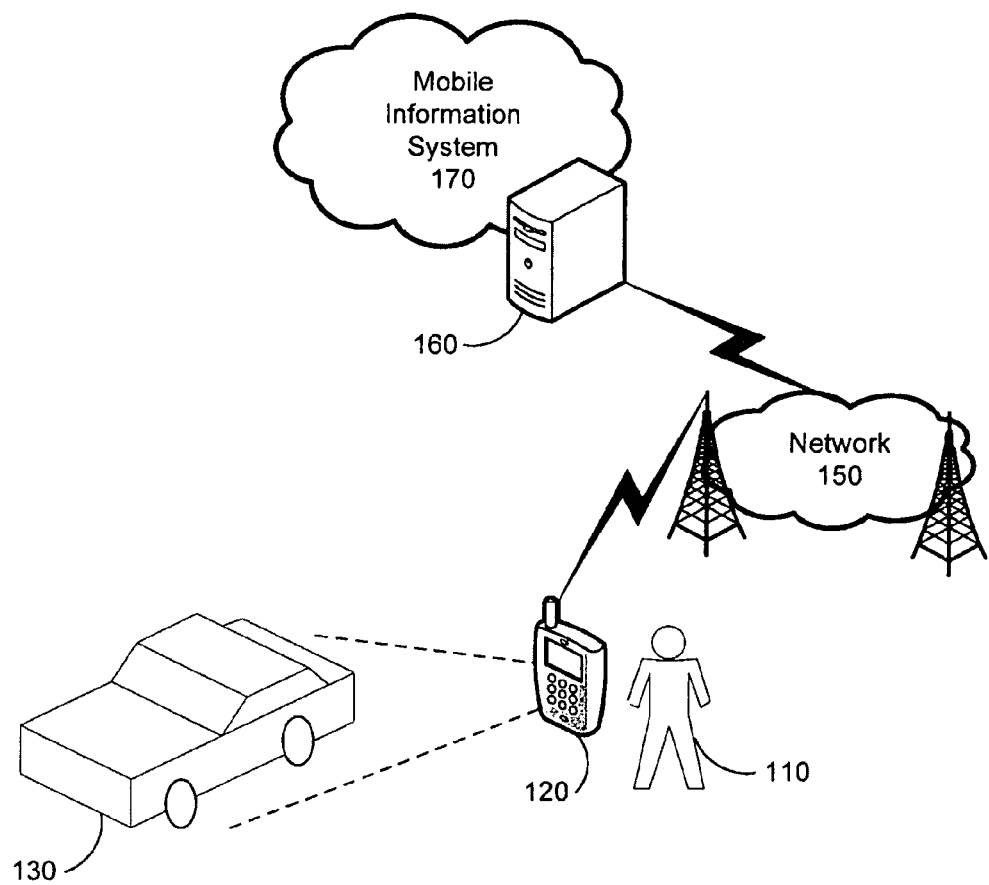
FIG. 1 is a graphical representation of an exemplary, non-limiting mobile automobile information system.

FIG. 1 illustrates a non-limiting diagram of an exemplary mobile automobile information system for providing vehicle information to a purchaser. Purchaser 110 may be visiting a dealer lot that has upon it vehicle 130. Purchaser 110 may be any person who is interested in purchasing a vehicle, or any person that merely wants to acquire more information about any vehicle or vehicle dealer. Vehicle 130 may be any vehicle, new or used, which is capable of transporting passengers, including, but not limited to, a car, a truck, a van, a minivan, a sport-utility vehicle, a motorcycle, a scooter, a recreational vehicle, a boat, or a tractor.

Purchaser 110 is operating mobile device 120. Mobile device 120 may be any device that is capable of operating on a wireless mobile communications network and that communicates with other devices using, at least in part, a wireless network. Examples of such devices include, but are not limited to, mobile telephones, mobile computers, personal data assistants ("PDAs"), navigation systems, vehicle communication systems, and wirelessly networked computers. Any device which can communicate with any other device by communicating, at least in part, wirelessly through a wireless network is contemplated as being within the scope of the present disclosure.

Mobile device 120 may include global positioning system ("GPS") components and/or software, enabling it to communicate with GPS satellites and determine its own location, speed, direction, and the current time. Mobile device 120 may be constructed such that it can communicate GPS-derived location and direction information to a telecommunications network, other devices, and/or purchaser 110. Mobile device 120 may include other means of determining its own location, speed, and/or direction, including receiving such information from a telecommunications network, or deriving such information from the use of technologies well known to those skilled in the art that utilize one or more cellular towers and analysis of signal strength, time delays, angles of arrival, or other measurements to determine a device's location. Such locating means include, but are not limited to, triangulation and hyperbolic fixing schemes. Such locating means may use time delays between mobile device 120 and two or more cellular towers to determine a relatively precise location for mobile device 120. The various means and methods of locating a device using cellular network measurements, including the use of time delay and/or signal strength to determine the location, speed, and/or direction of a mobile device, are well known to those skilled in the art, and therefore will not be recited herein. Any means of determining a mobile device's current or past location, speed, and/or direction are contemplated as within the scope of the present disclosure.

Mobile device 120 is serviced, at least in part, by network 150. Network 150 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("CDMA") networks, wireless computer networks such as Wi-Fi and IEEE 802.11 networks, and wired networks such as local area networks ("LANs"), wide area networks ("WANs"), intranets, and the Internet. Network 150 represents any possible combination of such networks, including a wireless network that may connect to the Internet and communicate with other devices that are connected, directly or indirectly, to the Internet. An example of such a device is server 160, which is part of mobile automobile information system 170 and capable of communicating with mobile device 120 over network 150.

In one embodiment, purchaser 110 may use mobile device 120 to acquire data about vehicle 130, analyze or transmit for analysis such data, and receive the results of the analysis. Acquiring vehicle data may be performed using any component of mobile device 120 capable of acquiring data. For example, purchaser 110 may activate a camera component of mobile device 120 to acquire one or more images of a section of vehicle 130. As is discussed in further detail herein, the images may then be sent to an analysis device, such as server 160, or the images may be analyzed on mobile device 120 or a cooperating component, and a response may be provided to purchaser 110 through mobile device 120.

Figure 2:
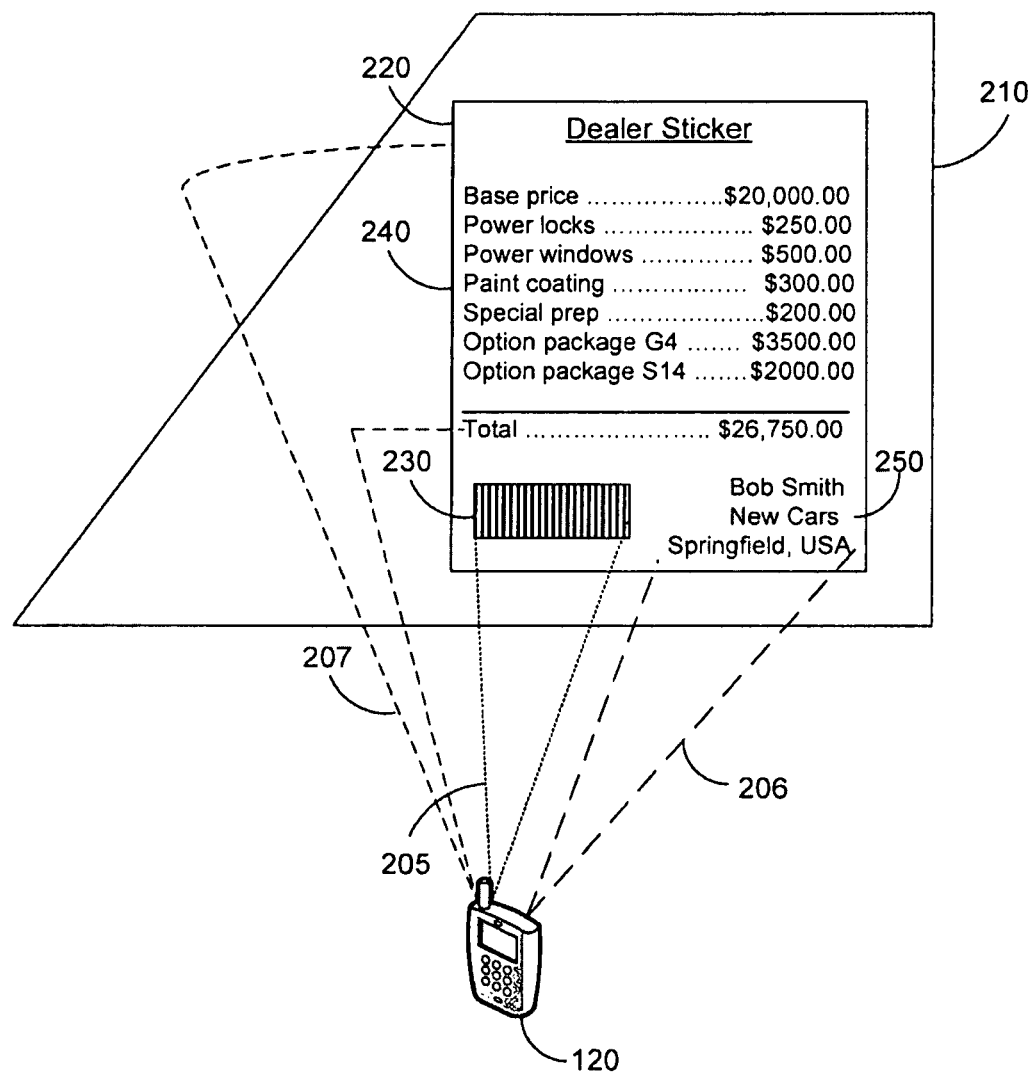
FIG. 2 is a graphical representation of an exemplary, non-limiting mobile device in use as a component in a mobile automobile information system.

In one embodiment, purchaser 110 uses mobile device 120 to acquire an image of a dealer sticker or a section of a dealer sticker. Referring now to FIG. 2, dealer sticker 220 is affixed to a section of vehicle 130, such as window 210. Dealer sticker 220 may take any form that is effective in conveying information and attachable to a vehicle, including, but not limited to, a piece of paper attached to a window of a vehicle. Dealer sticker 220 may contain an indication of vehicle sale price, vehicle options and associated prices, dealer identity information, or any other information describing or associated with the vehicle to which it is attached.

In one exemplary embodiment, dealer sticker 220 includes barcode 230. In an alternative embodiment, barcode 230 is displayed or located elsewhere on vehicle 130, such as an adhesive attached to vehicle 130 separate from dealer sticker 220. Barcode 230 may be any machine-readable representation of information or data, or any other type of code or detectable data indicator that may represent data, including printed parallel lines such as those used in Universal Product Code ("UPC") barcodes, patterns of dots, concentric circles, text codes hidden within images, and radio-frequency identification ("RFID") tags. Any other form of machine-readable or detectable data representation that may be affixed, printed on, or otherwise associated with a vehicle or a dealer sticker is contemplated as within the scope of the present disclosure.

Barcode 230 may be placed on vehicle 130 by a dealer who has an arrangement with a mobile automobile information system operator. For example, an insurer who operates a mobile automobile information system may arrange with a chain of automobile dealerships to provide barcodes for vehicles that the dealer stocks. The dealer may receive additional business from the insurer's customers because the customers will know that they can access the insurer's mobile automobile information system at that dealer. All other types of arrangements and configurations of dealership and mobile automobile information system interaction are contemplated as within the scope of the present disclosure.

Purchaser 110 may operate mobile device 120 to acquire image 205 of barcode 230. Image 205 may be stored on mobile device 120, and transmitted to mobile automobile information system 170 for analysis. Alternatively, mobile device 120 may perform the analysis of image 205. The results of such an analysis may then be provided to mobile device 120 for use by purchaser 110. Analyzing images and data and providing results of such analysis are discussed in further detail herein.

In another exemplary embodiment, dealer sticker 220 includes dealer information 250. Dealer information 250 may contain the name, address, phone number, or any other identifying information that may be associated with a new or used vehicle dealer or reseller. Dealer information 250 may be included on dealer sticker 220, or it may be found elsewhere on a vehicle, such as on a dealer license plate, or on a decal or insignia affixed to the vehicle. Any other form of dealer identification and any other placement and format of such identification is contemplated as within the scope of the present disclosure.

Purchaser 110 may operate mobile device 120 to acquire image 206 of dealer information 250. Image 206 may be stored on mobile device 120, and transmitted to mobile automobile information system 170 for analysis. Alternatively, mobile device 120 may perform analysis of image 206. The results of such an analysis may then be provided to mobile device 120 for use by purchaser 110. Analyzing and providing results of such analysis are discussed in further detail herein.

In yet another embodiment, dealer sticker 220 may include line items 240. Line items 240 may be lines of information identifying options, features, components, or any other item of interest associated with a vehicle. Line items 240 may include prices of the items identified in line items 240. Line items 240 may be displayed in locations other than dealer sticker 220, such as on a dealer price sheet separate from the vehicle or sticker. Any location or configuration of line items, and any format or content of line items, are contemplated as within the scope of the present disclosure.

Purchaser 110 may operate mobile device 120 to acquire image 207 of line items 240. Image 207 may be stored on mobile device 120, and transmitted to mobile automobile information system 170 for analysis. Alternatively, mobile device 120 may perform analysis of image 207. The results of such analysis may then be provided to mobile device 120 for use by purchaser 110. Analyzing and providing results of such analysis are discussed in further detail herein.

In yet another embodiment, purchaser 110 may operate mobile device 120 to acquire an image of dealer sticker 220 in its entirety. Alternatively, purchaser 110 may operate mobile device 120 to acquire one or more images of any section or component of vehicle 130, or any identifier, paper, sticker, decal, or any other information conveyance that may be attached to or associated with vehicle 130. All such images are contemplated as within the scope of the present disclosure.

Once an image or images are collected on mobile device 120, whether the image is one of the dealer sticker or portions thereof, or of other components, sections, insignia, or attached or associated information conveyance means associated with vehicle 130, analysis may then be performed on the data. Referring again to FIG. 1, in one embodiment, such analysis may be performed on a remote system. In this embodiment, the collected images may be transmitted to mobile automobile information system 170, or a component of mobile automobile information system 170 such as server 160, from mobile device 120, over a network or combination of networks, such as network 150. The transmission of the data may be performed when purchaser 110 operates mobile device 120 such that the transmission is initiated. Alternatively, a data collection application contained in mobile device 120 may automatically transmit data to a remote system for analysis. Means and methods of transmitting data from one device to another are well known to those skilled in the art and will not be recited herein. All such means and methods are contemplated as within the scope of the present disclosure.

In one embodiment, additional data is transmitted for analysis. Such additional data may include data provided by or obtained from mobile device 120 itself, such as time, date, and location information. Such additional data may also include information entered into, or otherwise configured on, mobile device 120 relating to purchaser 110. For example, purchaser's 110 name, address, telephone number, insurance policy number, email address, or any other information associated with purchaser 110 may be included as additional data. This data may be used in the analysis of image data. For example, images may be collected of dealer sticker 220, and such images may be analyzed in conjunction with GPS coordinates associated with the image. Such coordinates may be stored with the image, along with a timestamp, to identify a location where the image was acquired and the time of acquisition. Purchaser's 110 address and purchaser's 110 insurance policy number may be provided for analysis. Such information may be useful for providing further information that is time- or proximity-sensitive with the results of the analysis.

Analysis of collected images and data may be entirely performed automatically by one or more computers or other devices, or the analysis may be performed in whole or in part by humans. Here again, means and methods of analyzing data are well known to those skilled in the art and will not be recited herein. All such means and methods are contemplated as within the scope of the present disclosure.

In an alternative embodiment, analysis of acquired data is performed on mobile device 120. This may be accomplished through the use of one or more software applications or programs installed, configured, or otherwise operable and/or accessible on mobile device 120. Analysis on mobile device 120 may also be accomplished in conjunction with communication by mobile device 120 with other devices. Such communication may occur over a network or combination of networks such as network 150. Any analysis of data described herein, including analysis described in relation to a remote device such as server 160, may be performed on mobile device 120, and all such analysis is contemplated as within the scope of the present disclosure.

In one embodiment, image 205 of barcode 230 may be analyzed. During the analysis of image 205, a representation of barcode 230 may be derived from image 205, or the data represented by barcode 230 may be extracted directly from image 205. The data represented by barcode 230 may be analyzed and associated data may be located. For example, barcode 230 may represent data identifying the make, model, and year of manufacture of vehicle 130. Alternatively, barcode 230 may represent data identifying a database key or identifier which may be used to locate vehicle data. Once the data represented by barcode 230 is derived, further information about vehicle 130 may be acquired based on the represented data from databases, computing devices, or other sources of information based on the barcode data. Such acquired information may include, but is not limited to, list price, market price, dealer cost, availability of the same make, model, and year vehicle at other dealers, reviews of vehicle 130 and/or similar vehicles, and any other information that purchaser 110 may find informative.

Such information may also be based on additional information provided, such as location information or purchaser 110 personal or identifying information. For example, listings obtained of competing dealers' offerings may be filtered to only include dealers that are proximate to purchaser 110 based on the location information generated by mobile device 120. In another exemplary embodiment, purchaser's 110 address and insurance policy number may be used in conjunction with the make and model information derived from barcode 230 to determine the insurability of the vehicle and to generate an insurance quote for purchaser 110. In another exemplary embodiment, purchaser's 110 personal information may be used in conjunction with the make and model information derived from barcode 230 to determine purchaser's 110 eligibility for a loan to finance the purchase of vehicle 130 and to generate an offer to provide such financing.

Images and data collected and information derived therefrom may be used to search vehicle sales databases or other listings of vehicles for sale, electronic or otherwise, to locate other vehicles in which purchaser 110 may be interested. Means and methods of determining in which items a user who has expressed interest in a particular item may also be interested are well known to those skilled in the art and will not be recited herein. All such means and methods are contemplated as within the scope of the present disclosure.

In another embodiment, image 206 of dealer information 250 may be analyzed. Character recognition software, as commonly known to those skilled in the art, may be used to determine identifying information associated with the dealer from image 206. Such information may then be used to obtain additional information about the dealer. For example, Better Business Bureau ratings or complaints about the dealer may be obtained. Alternatively, other purchasers' experiences with the dealer may be of interest and may be available through publicly accessible sources, such as websites, or mobile automobile information system 170 may provide the ability for users to review and rank vehicle dealers. Such reviews and rankings, and any other dealer information that may be of interest to purchaser 110, may be obtained based on image 206. In yet another alternative, mobile automobile information system 170 may use dealer information to determine if mobile automobile information system 170 has a relationship with the dealer which may offer benefits to purchaser 110. For example, the operator of mobile automobile information system 170 may have a discount program with the dealer, who offers special pricing to users of mobile automobile information system 170. All such information, and any other information that may of interest to purchaser 110 and obtained by analysis of image 206 is contemplated as within the scope of the present disclosure.

In yet another embodiment, image 207 of line items 240 may be analyzed. Here again, character recognition software, as commonly known to those skilled in the art, may be used to determine what information is provided by line items 240. Line items 240 may be interpreted into purchaser-friendly language so that the meaning and import of line items 240 can be better understood by purchaser 110. For example, if line items 240 includes a line item listing an option package code, line items 240 may be analyzed to determine which options are included in the option package, and that information may be presented to purchaser 110. Alternatively, if line items 240 includes a line item listing an individual option and an associated price, line items 240 may be analyzed to determine the dealer cost of the individual option and the availability and cost of obtaining the individual option elsewhere after the purchase of vehicle 130. All other information that may be obtained from a line item is contemplated as within the scope of the present disclosure.

Other forms of analysis may be performed, and such analysis may be performed on other images collected. For example, an image of the entire dealer sticker 220 may be acquired and analyzed to provide vehicle, dealer, and line item information to purchaser 110. Alternatively, an image of a dealer license plate may be analyzed to determine dealer information. All other such images and analysis are contemplated as within the scope of the present disclosure.

Once the collected images and data are analyzed, a response may be provided to purchaser 110. If the analysis is performed remotely, such a response may be sent from mobile automobile information system 170 through server 160, or from another device operating in cooperation with server 160 or mobile automobile information system 170, to mobile device 120. Alternatively, when analysis is performed on mobile device 120, the response may be provided by mobile device 120 itself. Such a response may include the results of the analysis in the form of an email or text message, or the response may include a link to a webpage that displays the results. Alternatively, the response may be provided through an application on mobile device 120, or it may be provided by more traditional means of communication, such as by mail or via a voice call.

The contents of the response may vary according to the system design. The contents may include, but are not limited to, detailed results of the analysis including descriptions and details about vehicle 130, recommendations as to whether to purchase vehicle 130, prices and costs associated with vehicle 130 and its maintenance and upkeep, reviews of vehicle 130, and any other information that may be of interest to purchaser 110 or any other person interested in a vehicle. The contents of the response may also include supplemental information. Such contents may include insurance quotes, financing offers, recommendations for maintenance and service locations, listings of other vehicles available for sale, identification of and estimates for common repairs of similar vehicles, and certain areas of inquiry which purchaser 110 may wish to pursue, such as available warranties for vehicle 130 and reported problems with vehicle 130. Any other content that may be of interest to a user of mobile automobile information system 170 is contemplated as within the scope of the present disclosure.

Figure 3:
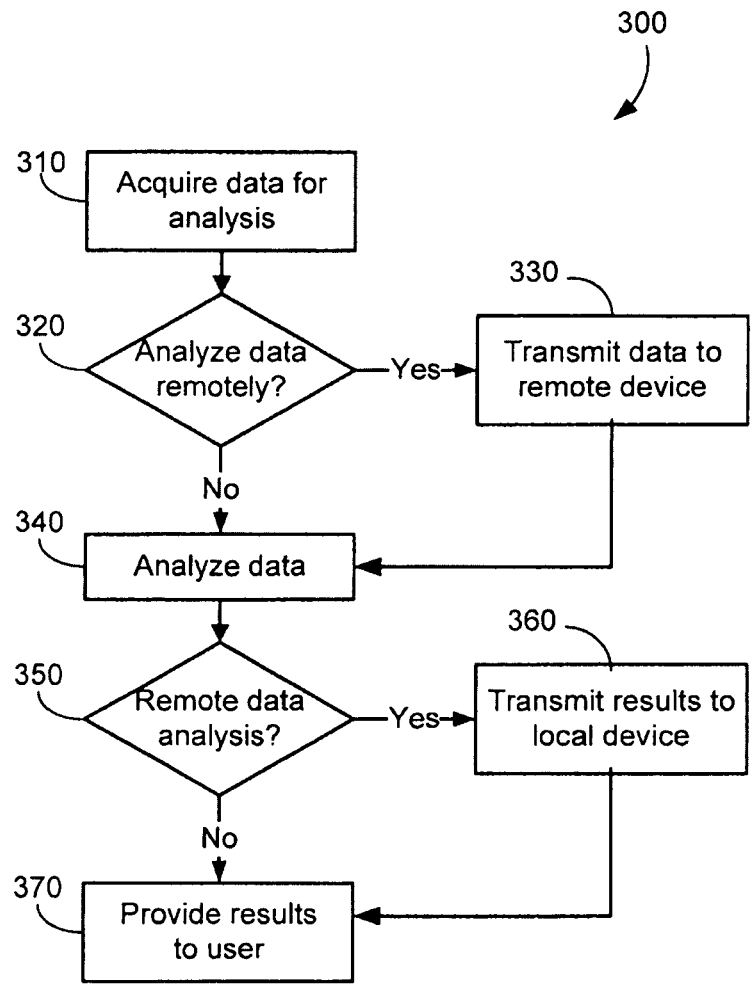
FIG. 3 is a flow diagram of an exemplary, non-limiting method of operating a mobile automobile information system.

FIG. 3 illustrates a non-limiting, exemplary method 300 of implementing the present subject matter. At block 310, data may be acquired for analysis. The acquired data may include images of a dealer sticker, or portions or sections thereof. The data acquired may also include data generated or otherwise obtained by a mobile device itself, such as location information, time and date information, or user personal information. The data may be acquired on a mobile device operated by a user as described herein, or it may be acquired using any other effective means, such as a digital camera. In one embodiment, data is acquired using a separate device that is communicatively connected to a mobile device. Such a device may be provided to a user on an as-needed basis. For example, an insurer may provide a data collection device, such as a digital camera, to an insured. This may assist the insured in obtaining information about a currently owned vehicle or a vehicle under consideration for purchase, and may assist the insurer by providing accurate and timely data to the insurer on a vehicle that the insurer may be currently insuring or may possibly insure in the future. In another example, a user may purchase a data collection device for personal use. Any means or methods of acquiring data for analysis of the condition, identification, or history of a vehicle are contemplated as within the scope of the present disclosure.

At block 320, a determination is made as to whether the analysis is to be performed locally or remotely. If the mobile device which was used to capture the data is capable of analyzing the data, then the method progresses to block 340. Otherwise, the data may be transmitted to a remote device for analysis at block 330. Transmission of the data may be accomplished using any effective means, and such means are well known to those skilled in the art and contemplated as within the scope of the present disclosure. The remote device which receives the data may be any device or multiple devices capable of analyzing the received data.

At block 340, the data and images are analyzed. Such analysis may include analyzing a barcode detected in an image of a dealer sticker to determine information about a vehicle and generate related information. Such analysis may also include determining dealer information from an image of a dealer sticker. In still another embodiment, analysis may include performing character recognition analysis or other analysis on images of line items which may be present on a dealer sticker to derive information about the line items and the vehicle. Such analysis may further include generating additional information, such as insurance quotes or financing offers based on vehicle information derived from an image and user personal information. Any other method or means of analyzing collected data is contemplated as within the scope of the present disclosure.

At block 350, a determination is made as to whether the analysis was performed locally or remotely. If performed locally, then the method progresses to block 370. Otherwise, the results of the analysis are transmitted to a local device at block 360. The local device may be the mobile device that gathered and transmitted collected data for analysis. Alternatively, results may be transmitted to another device accessible to the user, or the results may be transmitted to a third party device. For example, in one embodiment a vehicle purchaser may collect data and transmit the data for analysis, and a second party, such as a vehicle financing agent, may receive the results of the analysis to use in determining if the purchaser will qualify for a loan to purchase the vehicle. Any other methods or means of transmitting data to a local device are contemplated as within the scope of the present disclosure.

At block 370, the results of the analysis are provided to the user. The results may be provided in any manner described herein, or in any other effective manner. The results may also include other information not directly based on the analysis, such as recommendations as to a vehicle purchase, suggestions of alternative vehicles, warnings about identified or potential problems, or any other information which may be informative for the user. The format of the results may be any effective format, and may also contain means to acquire additional information, such as hyperlinks or other inputs which may be activated to initiate further gathering of information. Any and all such means and methods of providing, formatting, and supplementing the results of an analysis are contemplated as within the scope of the present disclosure.

In another embodiment, a mobile automobile information system may provide assistance to a vehicle purchaser in performing the actual purchase of the vehicle. Such assistance may be provided to a purchaser as they attempt to complete a purchase of a vehicle. Such assistance may be provided by human operator of the mobile automobile information system, may be completely automated, or may be a combination of both. For example, an automated system may interact with a purchaser through a mobile device providing purchase assistance throughout the entire vehicle purchase process. Alternatively, an automated system may provide purchase assistance until an issue arises that the automated system is not configured to assist with, or until the purchaser requests human intervention, at which time a human operator interacts with the purchaser. In yet another embodiment, in-person purchase assistance may be arranged, automatically or through human interaction. Such purchase assistance may be take the form of a person associated with the mobile automobile information system coming to a site and assisting the purchaser by interacting with the seller. Such a person may be directly associated with the mobile automobile information system, or may be associated with a third party that has contracted or otherwise arranged with a mobile automobile information system to provide such services. Any other means or methods of providing purchase assistance are contemplated as within the scope of the present disclosure.

Interaction between the mobile automobile information system purchase assistance feature and the purchaser may take any effective form. In one embodiment, purchase assistance is provided through software installed or otherwise configured on a mobile device, which, through the mobile device, communicates with a mobile automobile information system. Alternatively, the application on the mobile device may perform the activities of providing purchase assistance without communication with other devices. The interaction may occur using any means known to those skilled in the art, including menu-driven and text-based interaction. In another embodiment, interaction is provided through a voice conversation held over a voice connection between a mobile device operated by the purchaser and a telephone operated by an operator of the mobile automobile information system. Any other means or methods of interaction in providing purchase assistance are contemplated as within the scope of the present disclosure.

Figure 4:
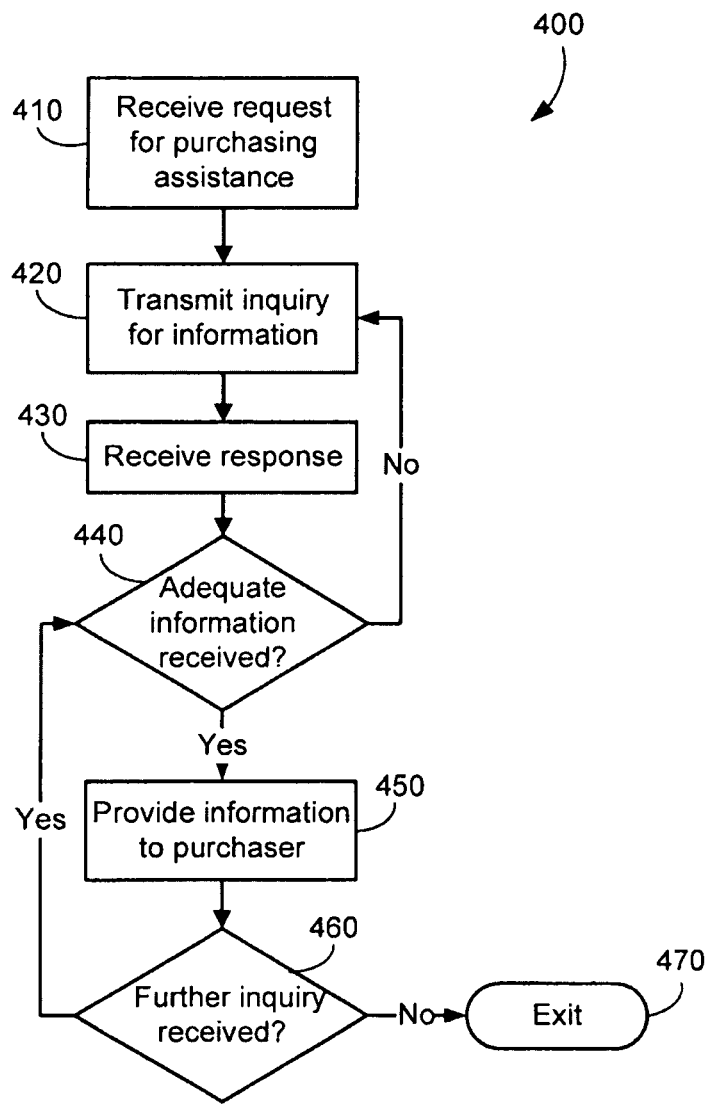
FIG. 4 is a flow diagram of an exemplary, non-limiting method of operating a mobile automobile information system.

FIG. 4 illustrates a non-limiting, exemplary method 400 of implementing the present subject matter. At block 410, a request is received for purchase assistance from a purchaser. Such a request may be received at a mobile automobile information system over a network or combination of networks, and received on a computing device. A purchase assistance request may originate from a mobile device operated by the purchaser. The mobile device may be configured with, or otherwise contain, an application which will alert the mobile automobile information system of a purchase assistance request, or the purchaser may operate the mobile device such that a request is sent to the mobile automobile information system, for example by sending a text message or email, or by placing a voice call to the mobile automobile information system. Any other methods or means of notifying a mobile automobile information system of a purchase assistance request are contemplated as within the scope of the present disclosure.

At block 420, a mobile automobile information system may respond to the purchase assistance request with an inquiry for information. The inquiry may be transmitted to a mobile device operated by the user. The requested information may include the make, model, and year of manufacture of the vehicle being purchased. Requested information may also include purchaser information, such as a username and password, member number, or other identifier. The initial inquiry for information may be a request for any information that a mobile automobile information system may need to initiate purchase assistance, and all such information is contemplated as within the scope of the present disclosure.

At block 430, a mobile automobile information system may receive a response to the inquiry transmitting at block 420. Here again, such response may be received from a mobile device operated by the purchaser. At block 440, the response provided by the purchaser may be evaluated to determine if the information in the purchaser's response is adequate to generate information that will assist the purchaser in the purchasing process. For example, if the purchaser responds to an initial request from the mobile automobile information system for a make and model, and the mobile automobile information system receives a response from the purchaser containing only a vehicle make, then the mobile automobile information system may request the model by returning to block 420. Such a verification of the sufficiency of a purchaser's response to a request for information may be performed automatically by one or more computing devices, or by a human operator of the mobile automobile information system. All other requests and verifications of sufficiency of responses are contemplated as within the scope of the present disclosure.

If adequate information was received, at block 450 information responsive to the purchaser provided information is provided to the purchaser. For example, after receiving make, model, and year of manufacture information, the mobile automobile information system may provide a market price of the vehicle. Alternatively, after receiving a username and password that verified the purchaser's eligibility to use the mobile automobile information system, the mobile automobile information system may provide a confirmation of successful verification. Any other such information responsive to purchaser provided information is contemplated as within the scope of the present disclosure. Information responsive to the purchaser provided information may be provided to the purchaser through any of the means described herein, including through a mobile device.

At block 460, a determination is made as to whether further inquiry was received from the purchaser. It is not uncommon for the process of purchasing a vehicle to be composed of several steps, and each step may involve information received from the dealer which the purchaser may need assistance in evaluating. For example, after receiving a market price for a vehicle from the mobile automobile information system, a purchaser may then wish to know if dealer add-on options on the vehicle are a good value. The purchaser may inquire of the mobile automobile information system whether the price the dealer is quoting for an add-on is fair. Alternatively, the purchaser may have arrived at the financing stage of the purchase process, and may wish to know whether the terms offered by the dealer are fair. In yet another alternative, the purchaser may have asked the dealer a question and received a response from the dealer that the purchaser suspects may not be accurate. The purchaser may then transmit the same question to the mobile automobile information system to verify the dealer's response. Many further inquiries may be made during the process of purchasing a vehicle, and all such inquiries are contemplated as within the scope of the present disclosure.

If further inquiry is made by the purchaser, the method returns to block 440 to determine if the inquiry contains adequate information to generate a response. If not, a request for further information if transmitted to the purchaser at block 420, and the method progresses as described herein. If adequate information is received from the purchaser, then the mobile automobile information system performs the analysis and data collection and forms a response which is provided to the purchaser at block 450. Method 400 then progresses to block 460. At block 460, if no further inquiry is received, method 400 terminates at block 470.

The responses provided by the mobile automobile information system in the method described herein may include information that provides additional options for the purchaser. For example, when an inquiry is received from a purchaser for information about a financing offer from a dealer, such as at block 460, the mobile automobile information system may respond with one or more competing offers. Likewise, when an inquiry is received from a purchaser which includes the make, model, and year of a vehicle, the mobile automobile information system may respond with the market price of the vehicle and a quote for insuring the vehicle. Any such additional information is contemplated as within the scope of the present disclosure.

While example embodiments of a mobile automobile information system have been described in connection with various computing devices, the underlying concepts may be applied to and implemented, in part or whole, in any computing device or system capable of implementing a mobile automobile information system as disclosed herein. The various techniques described herein may be implemented in connection with hardware or software or, where appropriate, with a combination of both. Thus, the systems and methods for implementing a mobile automobile information system, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a mobile automobile information system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a mobile automobile information system may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device ("PLD"), a client computer, or the like, the machine becomes an apparatus for implementing a mobile automobile information system. When implemented on a general-purpose processor, the program code combines with the processor to provide a unique apparatus that operates to invoke the functionality of a mobile automobile information system. Additionally, any storage techniques used in connection with a mobile automobile information system can invariably be a combination of hardware and software.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A method of obtaining information about a vehicle, comprising:
   receiving an image of a vehicle dealer sticker from a user by a computer system;
   receiving geographical coordinates associated with the image by the computer system;
   determining a vehicle associated with the image by the computer system;
   parsing, by the computer system, the image to extract dealer information from the image, the dealer information being associated with the vehicle;
   collecting information associated with the vehicle and the geographical coordinates by the computer system; and
   providing the vehicle information and the information associated with the geographical coordinates to the user by the computer system.

2. The method of claim 1, wherein receiving the image from the user comprises receiving a transmission from a mobile device operated by the user.

3. The method of claim 1, wherein providing the vehicle information to the user comprises providing a market price for the vehicle.

4. The method of claim 1, further comprising providing dealer information to the user about a vehicle seller.

5. The method of claim 1, further comprising providing to the user a financing offer.

6. The method of claim 1, further comprising providing an insurance quote for insuring the vehicle to the user.

7. The method of claim 1, further comprising providing a listing of alternative vehicles to the user.

8. The method of claim 1, further comprising providing dealer ratings to the user based on the dealer information.

9. A system for obtaining information about a vehicle, comprising:
   at least one computer device; and
   at least one subsystem of the at least one computer device that:
      receives an image of a vehicle dealer sticker from a user;
      receives geographical coordinates associated with the image;
      determines a vehicle associated with the image;
      parses the image to extract dealer information from the image, the dealer information being associated with the vehicle;
      collects information associated with the vehicle and the geographical coordinates; and
      provides the vehicle information and the information associated with the geographical coordinates to the user.

10. The system of claim 9, wherein the at least one subsystem that receives the image from the user comprises at least one subsystem that receives a transmission from a mobile device operated by the user.

11. The system of claim 9, wherein the at least one subsystem that provides the vehicle information to the user comprises at least one subsystem that provides a market price for the vehicle.

12. The system of claim 9, further comprising at least one subsystem that provides dealer information to the user about a vehicle seller.

13. The system of claim 9, further comprising at least one subsystem that provides to the user a financing offer.

14. The system of claim 9, further comprising at least one subsystem that provides an insurance quote for insuring the vehicle to the user.

15. The system of claim 9, further comprising at least one subsystem that provides a listing of alternative vehicles to the user.

16. The system of claim 9, further comprising at least one subsystem that provides dealer ratings to the user based on the dealer information.

17. A non-transitory tangible computer-readable medium comprising computer-readable instructions stored thereon for obtaining information about a vehicle, said computer-readable instructions when executed by a computer device cause the computer device to perform the steps of:

receiving an image of a vehicle dealer sticker from a user;
receiving geographical coordinates associated with the image; determining a vehicle associated with the image;
parsing the image to extract dealer information from the image, the dealer information being associated with the vehicle;
collecting information associated with the vehicle and the geographical coordinates; and
providing the vehicle information and the information associated with the geographical coordinates to the user.

18. The non-transitory computer-readable medium of claim 17, wherein receiving the image from the user comprises receiving a transmission from a mobile device operated by the user.

19. The non-transitory computer-readable medium of claim 17, wherein the providing the vehicle information to the user comprises providing a market price for the vehicle.

20. The non-transitory computer-readable medium of claim 17, further comprising providing dealer information to the user about a vehicle seller.

21. The non-transitory computer-readable medium of claim 17, further comprising providing to the user a financing offer.

22. The non-transitory computer-readable medium of claim 17, further comprising providing an insurance quote for insuring the vehicle to the user.

23. The non-transitory computer-readable medium of claim 17, further comprising providing a listing of alternative vehicles to the user.

24. The non-transitory computer-readable medium of claim 17, further comprising providing dealer ratings to the user based on the dealer information.

\* \* \* \* \*